US006771640B2

(12) United States Patent
Karamchedu et al.

(10) Patent No.: US 6,771,640 B2
(45) Date of Patent: Aug. 3, 2004

(54) VIRTUAL CALLING CARD WITH ARBITRARY CONTROLS

(75) Inventors: Murali Karamchedu, Beaverton, OR (US); Jeffrey B. Sponaugle, Hillsboro, OR (US)

(73) Assignee: ITXC, Inc., Beaverton, OR (US)

( * ) Notice: Subject to any disclaimer, the term of this patent is extended or adjusted under 35 U.S.C. 154(b) by 199 days.

(21) Appl. No.: 09/910,682

(22) Filed: Jul. 20, 2001

(65) Prior Publication Data

US 2002/0071426 A1 Jun. 13, 2002

Related U.S. Application Data

(63) Continuation-in-part of application No. 09/694,657, filed on Oct. 23, 2000.

(51) Int. Cl.[7] .............................................. H04L 12/66
(52) U.S. Cl. ........................ 370/352; 370/353; 370/354; 370/400; 348/15; 709/202; 709/204; 709/205; 379/201.01; 379/202.01
(58) Field of Search ................................. 370/260, 261, 370/352, 353, 354, 400, 401; 709/202, 204, 205, 210, 211; 379/201.01, 202.01, 204.01, 205.01; 348/13, 15

(56) References Cited

U.S. PATENT DOCUMENTS

| 5,844,973 | A | * | 12/1998 | Venkatraman et al. | 379/127.05 |
|---|---|---|---|---|---|
| 5,889,774 | A | * | 3/1999 | Mirashrafi et al. | 370/352 |
| 6,175,619 | B1 | * | 1/2001 | DeSimone | 379/202.01 |
| 6,275,575 | B1 | * | 8/2001 | Wu | 379/202.01 |
| 6,335,927 | B1 | | 1/2002 | Elliott et al. | 370/352 |
| 6,564,261 | B1 | * | 5/2003 | Gudjonsson et al. | 709/227 |
| 2001/0026609 | A1 | * | 10/2001 | Weinstein et al. | 379/93.01 |

* cited by examiner

Primary Examiner—Alpus H. Hsu
Assistant Examiner—Michael J Molinari
(74) Attorney, Agent, or Firm—Kaplan & Gilman, LLP

(57) ABSTRACT

A system is described including services for generating an electronic offer to participate in a voice communication session with a destination party, with the offer being contingent upon the satisfaction of a set of one or more offeror-stipulated conditions. The system further including services for receiving an indication from an offeree via a data network indicating acceptance of the offer and establishing the voice communication session between the offeree and the destination party in conformance with at least a subset of the one or more offeror-stipulated conditions.

40 Claims, 9 Drawing Sheets

Fig. 3(a)

```
┌─────────────────────────────────┐
│  CALL TYPE                   X  │
├─────────────────────────────────┤
│                                 │
│   SELECT TYPE OF VOICE CALL:    │
│                                 │
│     VOIP  TO  VOIP      ☐       │
│                                 │
│     VOIP  TO  PSTN      ☐       │
│                                 │
│     PSTN  TO  VOIP      ☐       │
│                                 │
│     PSTN  TO  PSTN      ☒       │
│                                 │
│     ┌──────────┐                │
│     │ CONTINUE │                │
│     └──────────┘                │
└─────────────────────────────────┘
```

Fig. 3(b)

```
┌─────────────────────────────────┐
│  CALLING INFO (VOIP to VOIP) X  │
├─────────────────────────────────┤
│                                 │
│      DESIGNATE OFFEREE          │
│      ┌──────────────────┬─┐     │
│      │ 128.256.1.2      │▼│     │
│      └──────────────────┴─┘     │
│                                 │
│    DESIGNATE DESTINATION PARTY  │
│      ┌──────────────────┬─┐     │
│      │ JOE SMITH        │▼│     │
│      └──────────────────┴─┘     │
└─────────────────────────────────┘
```

Fig. 3(c)

```
┌─────────────────────────────────┐
│  CALLING INFO (VOIP to PSTN) X  │
├─────────────────────────────────┤
│                                 │
│       DESIGNATE OFFEREE         │
│      ┌──────────────────┬─┐     │
│      │ JOE SMITH        │▼│     │
│      └──────────────────┴─┘     │
│                                 │
│    DESIGNATE DESTINATION PARTY  │
│      ┌──────────────────┬─┐     │
│      │ 1-800-555-1234   │▼│     │
│      └──────────────────┴─┘     │
└─────────────────────────────────┘
```

FIG. 3(d)

```
CALLING INFO (PSTN to VOIP)                    X
        DESIGNATE OFFEREE
            [ JOE SMITH       ▼]

DESIGNATE DESTINATION PARTY
            [ SAM JONES       ▼]
```

FIG. 3(e)

```
CALLING INFO (PSTN to PSTN)                    X
        DESIGNATE OFFEREE
            [ 408-555-6789    ▼]

DESIGNATE DESTINATION PARTY
            [ 503-555-2468    ▼]
```

FIG. 3(f)

```
BILLING INFO                                   X
    SELECT PAYMENT METHOD
        BILL TO CREDIT CARD   □
        BILL TO ACCOUNT       □

ENTER USER NAME
        [                  ▼]
    ENTER PASSWORD
        [                   ]

ENTER CREDIT CARD NUMBER
        [                   ]
    ENTER EXPIRATION DATE
        [JAN ▼] [00 ▼]      [CONTINUE]
```

| CALL CONTROLS | | | | X |
|---|---|---|---|---|

LIMIT CALL TIME ☐  ▢ ▼  PM ▼
                      TO
                 11:00 ▼  PM ▼

---

LIMIT CALL DATE ☐

SINGLE USE ☐  MNTH ▼  DAY ▼  YR ▼

REOCCURRING ☐  DAY ▼

---

LIMIT CALL AREA ☐

BY COUNTRY ☐  ▢ ▼

BY STATE ☐  ▢ ▼

BY AREA CODE ☐  ▢ ▼

[ CONTINUE ]   [ CANCEL ]

FIG. 3G

```
<Ptt Token>
     <CALLER NAME> John Smith </CALLER NAME>
     <CALL1 TYPE> PSTN </CALL1 TYPE>
     <CALLER PN> 408-555-6789 </Caller PN>
     <CALLEE NAME> Mom & Dad Smith </CALLEE NAME>
     <CALL2 TYPE> PSTN </CALL2 TYPE>
     <CALLEE PN> 503-555-2468 </CALLEE PN>
</Ptt Token>

<Ptt Token>
     <CALLER NAME> John Smith </CALLER NAME>
     <CALL1 TYPE> VOIP </CALL1 TYPE>
     <CALLER IP> 128.256.1.2 </Caller IP>
     <CALLEE NAME> Mom & Dad Smith </CALLEE NAME>
     <CALL2 TYPE> PSTN </CALL2 TYPE>
     <CALLEE PN> 503-555-2468 </CALLEE PN>
</Ptt Token>
```

FIG. 7

VIRTUAL CALLING CARD WITH ARBITRARY CONTROLS

RELATED APPLICATIONS

The present invention is a continuation-in-part of copending application Ser. No. 09/694,657 entitled "Method And Apparatus For Establishing A Voice Call By Way Of An Electronic Mail Message" filed on Oct. 23, 2000 by Jeffrey B. Sponaugle, et al. and commonly assigned to the assignee of the present invention.

BACKGROUND OF THE INVENTION

1. Field of the Invention

The invention relates generally to the field of telecommunications and, in particular to a method and apparatus for establishing a voice call by way of an electronic mail message.

2. Background Information

In recent years, information technology including personal computer, telecommunication, and television technologies have begun to converge, whereby clear demarcations that once separated the various technologies have blurred. This "convergence" may be attributed, at least in part, to the explosive growth of the Internet.

Internet based voice communication is one advance in the telecommunications industry that has been made possible through the growth of the Internet. For example, calls that were once required to be managed by the public switched telephone network (PSTN) that assigns a dedicated communication line or circuit for each user to complete a telephone call, may now be connected through the shared medium of the Internet by breaking the voice data into varying sized packages or "packets," and transmitting them over the shared medium of the Internet.

The Internet Protocol (IP) is a protocol utilized throughout the Internet to interleave and transmit data packets so as to best utilize the available bandwidth at any given time. Voice over IP (VoIP) is a term used to describe a set of services for managing the delivery of voice information using the Internet protocol. Various software products on the market provide VoIP services that enable two parties (e.g., caller and callee) to communicate with each other through the Internet. In order to do so, however, each of the parties to the VoIP call are typically required to communicate through hardware utilizing compatible voice encoders or "CODECs." Although emerging standards such as the International Telecommunication Union's (ITU) H.323 standard attempts to alleviate the CODEC compatibility issue, the parties to the call are nonetheless each required to communicate through a computer system or appliance equipped to place and/or receive VoIP calls. Unfortunately, however, not everyone has access to such VoIP equipped hardware. In fact, given the wide availability of PSTN handsets and their associated ease of use, even those who have access to such VoIP equipped hardware may nonetheless prefer to communicate via the more commonplace PSTN handsets.

U.S. Pat. No. 6,026,087, titled "Method and Apparatus for Establishing a Voice Call to a PSTN Extension for a Networked Client Computer" (having a common assignee with the present application) addresses the need for bridging the Internet and packet based devices with conventional PSTN handsets. Accordingly, a user of a networked computer can place a voice call to a PSTN extension (equipped with merely a conventional handset) rather than being limited to placing a voice call to only VoIP equipped hardware. Although this goes a long way towards integrating the VoIP functionality of the Internet with the PSTN, further integration remains desirable.

BRIEF DESCRIPTION OF THE DRAWINGS

The invention is illustrated by way of example, and not by way of limitation in the figures of the accompanying drawings in which like reference numerals refer to similar elements, and in which.

FIGS. 3(A–G) are graphical illustrations, each representing various data input dialogs presented to an offeror in association with generation of one or more the tokens according to one embodiment of the present invention;

FIG. 7 illustrates two examples of an XML data structure each representing an electronic token according to one embodiment of the present invention.

DETAILED DESCRIPTION

In the following description, for purposes of explanation, specific numbers, materials and configurations are set forth in order to provide a thorough understanding of the invention. It will be apparent, however, to one skilled in the art that the invention may be practiced without these specific details. In some instances, structures and devices are shown in block diagram form in order to avoid obscuring the invention. In other instances, well known features are omitted or simplified in order not to obscure the present invention. For ease of understanding, certain method steps are delineated as separate steps, however, these separately delineated steps should not be construed as necessarily order dependent in their performance. Furthermore, reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
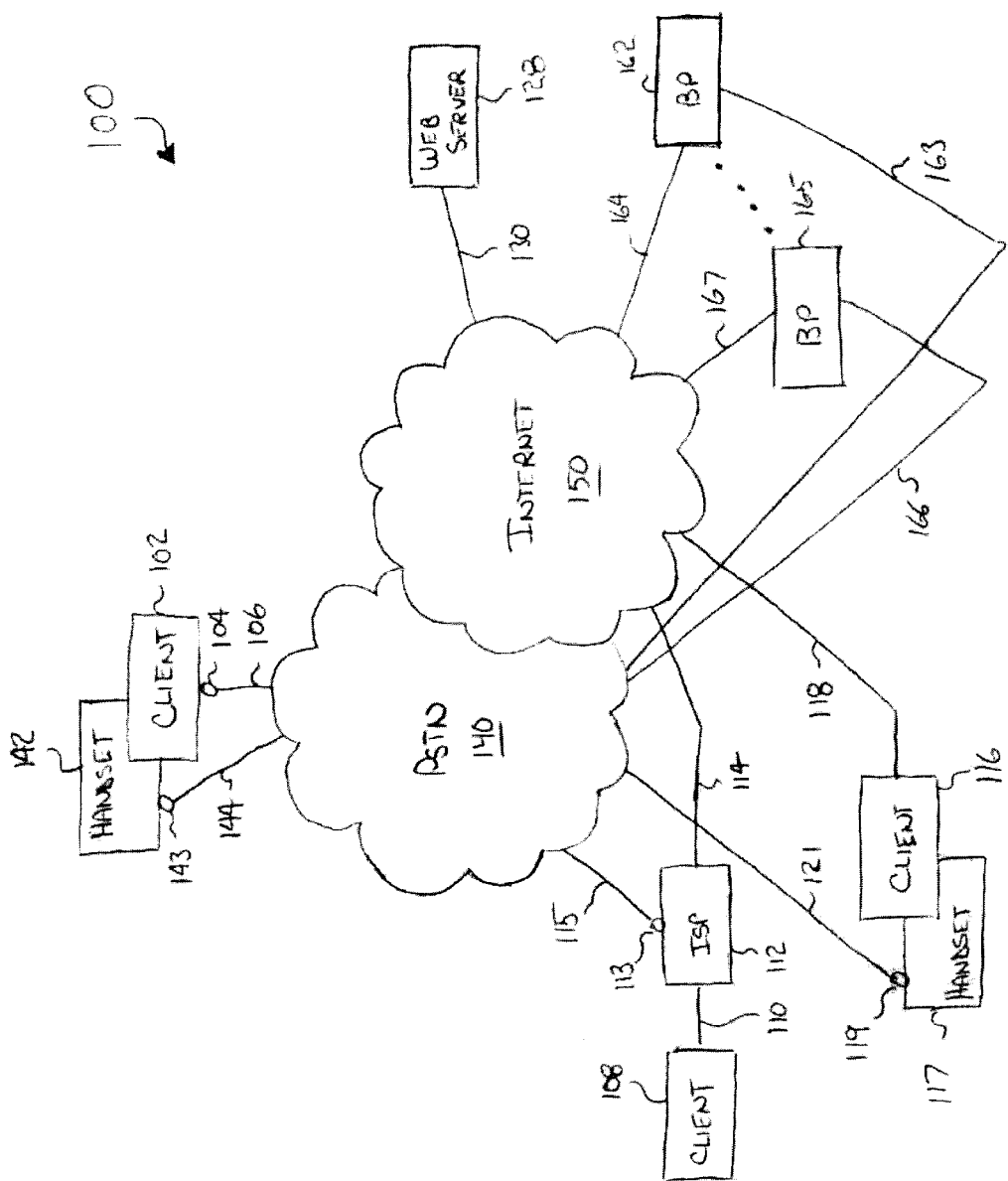
FIG. 1 is a block diagram illustrating an example communication system incorporating the teachings of the present invention.

In FIG. 1, a block diagram is presented illustrating an example communication system 100 incorporating the teachings of the present invention. While the present invention will be described in the context of this communication system, based on the descriptions to follow, those skilled in the art will appreciate that the present invention is not limited to this embodiment. Referring now to FIG. 1, client computers 102, 108 and 116, handsets 142 and 117, web server 128, and bridgeports 162 and 165 are communicatively coupled to each other by way of PSTN 140 and Internet 150 as shown.

Figure 6:
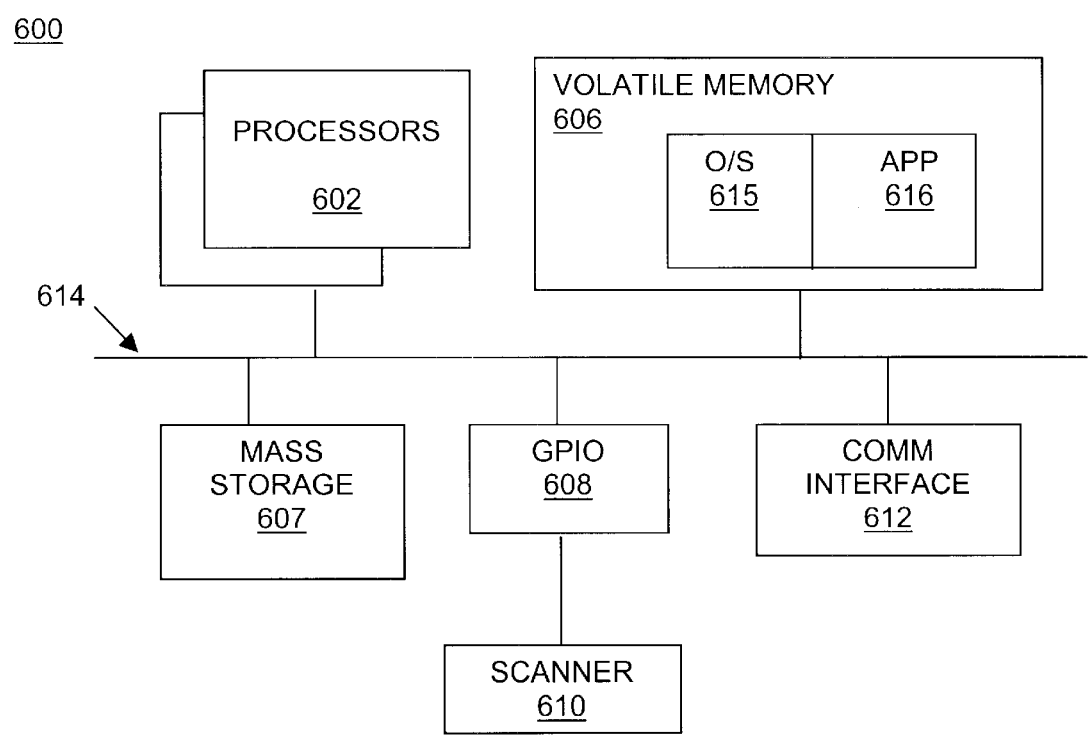
FIG. 6 illustrates an example computer system suitable for use as a web server and/or one or more of client computers incorporating the teachings of the present invention.

Except for the teachings of the present invention (to be more fully described below), client computers 102, 108 and 116 are intended to represent a broad category of Internet telephony enabled devices such as a computer system, palm sized personal digital assistants (PDA), Internet appliance, set-top box, and so forth. FIG. 6 illustrates an example computer system suitable for use as one or more of client computers 102, 108 and 116 and/or web server 128. As shown, system 600 includes one or more processors 602, such as a PENTIUM™ processor manufactured by Intel Corporation of Santa Clara, Calif.; System memory 606, including both operating system 615, such as WINDOWS™ 95, 98, or 2000 with internetworking communication and socket services, and one or more applications 616; Mass storage devices 607, such as a diskette drive, hard drive, CDROM and so forth; GPIO 608 for interfacing with I/O devices such as a keyboard and cursor control devices, and for inputting, digitizing and compressing outbound audio, and for decompressing and rendering inbound audio; and Communication interfaces 612, such as MODEMs, network interface cards, and so forth for sending and receiving various data packets (including audio data packets) in accordance with certain standard communication protocols. The elements of system 600 are coupled to each other via system bus 614, which may represent multiple buses bridged by one or more bus bridges (not shown). Except for the teachings of the present invention, each of the elements of system 600 performs its conventional functions known in the art. In particular, system memory 604 and mass storage 606 are employed to store a working copy and a permanent copy of the programming instructions implementing the token generation and/or call placement services of the present invention.

As illustrated in FIG. 1, client computer 102 is coupled to ISP 112 through PSTN extension 104, communication line 106, PSTN 140, communication line 115, and PSTN extension 113. In turn, ISP 112 is coupled to Internet 150 by direct connection 114. Client computer 102 is equipped to communicate with ISP 112 through, for example, a modulation/demodulation (MODEM) device (not shown) coupled to PSTN extension 104, while client computer 108 is equipped with a network interface to communicate with ISP 112 through network connection 110. Rather than being connected to ISP 112, client computer 116 is directly coupled to Internet 150 using direct connection 118. It should be noted, however, that the various connections between client computers 102, 108, and 116, and PSTN 140 and Internet 150 described above, are merely illustrative and may vary from that which is described. For example, instead of being directly coupled to Internet 150, client computer 116 may be connected to Internet 150 through ISP 112 without departing from the spirit and scope of the invention.

Handsets 142 and 117 are intended to represent a broad category of conventional telephone handsets, including but not limited to desktop handsets, cordless handsets and wireless handsets. Handset 142 is coupled to PSTN 140 through PSTN extension 143 and communication line 144, whereas handset 117 is coupled to PSTN 140 through PSTN extension 119 and communication line 121. Communication lines 106, 144, 115, and 121 may simply be plain old telephone service (POTS) communication lines, although other types of communication lines may be used. For example, in the case of communication line 106, it may be an integrated service digital network (ISDN) line, whereas in the case of communication line 115, it may be a T1 (1.533 Mbps) or an E1 (2.0488 Mbps) trunk line. Each of communication lines 144 and 121 may be a wireless cellular connection, a Personal Communication Services (PCS) connection, and the like.

Internet 150 includes a number of local and/or global networks interconnected by routers to communicatively couple the various client computers, web servers and bridgeports of FIG. 1 together. PSTN 140 on the other hand includes a number of Service Switching Points (SSP), Signal Transfer Points (STP), and Service Control Points (SCP) coupled to each other (not shown). PSTN extension 104 is coupled through communication line 106 to a "local" SSP, which in turn is coupled to a number of other "local" PSTN extensions, including for example, PSTN extension 113 if ISP 112 is a "local" ISP served by the same SSP. In addition, the "local" SSP is also coupled to an associated STP, which in turn is coupled to other "remote" SSPs. Each of the "remote" SSPs is coupled to a number of "remote" PSTN extensions, including for example, extension 119 if handset 117 is a "remote" handset served by a "remote" SSP.

Bridgeports 162 and 165 are coupled to Internet 150 through connections 164 and 167 respectively, and to PSTN 140 through communication lines 163 and 166 respectively. Each of bridgeports 162 and 165 represent a server to determine an appropriate destination PSTN extension, such as the PSTN extension of telephone handset 117 for example, as well as an appropriate one of the community of Internet/PSTN changeover servers (e.g., bridgeports 162 and 165) to place a voice call to a PSTN extension and facilitate the voice call between a user of client computer 102 or 108, for example, and the user of a PSTN endpoint, such as handset 17. In one embodiment, bridgeports 162 and 165 facilitate establishment of a voice call between two PSTN extensions in response to an offeree activating the electronic token of the present invention. In an alternative embodiment, in addition to facilitating establishment of a voice call between two PSTN extensions, at least one of bridgeports 162 and 165 additionally operate to generate the electronic token of the present invention, i.e. serving also as web server 128. Further details regarding the functionality of bridgeports 162 and 165 may be found in U.S. Pat. No. 5,889,774, titled "Method and Apparatus for Selecting an Internet/PSTN Changeover Server for a Packet Based Phone Call" (having a common assignee with the present application), which is hereby incorporated by reference.

Web server 128 is coupled to Internet 150 through connection 130, but may also be coupled to PSTN 140 by way of additional connections (not illustrated). In one embodiment, web server 128 is an Internet portal. In alternate embodiments, web server 128 may be an e-commerce site or a corporate presence web server. In one embodiment, web server 128 is equipped to generate a graphical call button that is associated with the electronic call token of the present invention. In one embodiment, web server 128 generates the graphical call button based at least in part upon data provided to web server 128 by, for example, client computer 102. In an alternative embodiment, in addition to generating the graphical call button of the present invention, web server 128 further facilitates establishment of a voice call between two PSTN extensions in response to an offeree activating the electronic call token, i.e. serving also as one of the bridgeports. Typically, the electronic call button is disposed in a content page of web server 128. The services in support of the inclusion of the electronic call button is executed on web server 128, whereas the services in support of the communication with bridgeports 162 and 165 to facilitate the establishment of the call is embedded with the content page and executed on the caller's computing (i.e. client) device. However, in alternate embodiments, the services in support of the communication with bridgeports 162 and 165 to facilitate the establishment of the call may be executed on web server 128 instead.

For the purposes of this disclosure, any client that generates the electronic token of the present invention, or causes such a token to be generated, will be referred to as an offeror, whereas any client that receives the electronic call token/button representing an offer to participate in a voice call will be referred to as an offeree. In one embodiment, web server 128 generates the call button in association with a contractual relationship previously established between an offeror (e.g. the user of client computer 102) and the third party business entity that owns and/or operates web server 128. Depending upon the contractual relationship that may exist between the third party operator of web server 128 and an offeror, such as the user of client computer 102 for example, web server 128 may provide the call button generation and call connection services of the present invention to the offeror in exchange for payment of a fee to the operator of web server 128 by the offeror. In one embodiment of the invention, the offeror is charged a subscription-based fee, whereby the offeror may make unlimited use of the services provided by the third party within a specified time period. In an alternative embodiment, the offeror is charged a "per use" fee, whereby the offeror is charged a fee each time the offeror utilizes the third party services of the present invention.

For example, assume the user of client computer 102 has entered into a subscription based contractual relationship with a third party business entity that owns and operates web server 128. In exchange for paying a determined sum of money to the third party, the user of client computer 102 is permitted to cause web server 128 to generate an unlimited number of call buttons, each representing an offer to participate in a voice call. Further assume, as described earlier, that client computer 102 is communicatively coupled to web server 128 through PSTN 140, ISP 112 and Internet 150. In order to cause web server 128 to generate a call button representing an offer to participate in a voice call, client computer 102 would first establish a communication session with web server 128 using, for example, a predetermined username and password. Once web server 128 has authenticated the identity of client computer 102, client computer 102 is provided access to standard and/or custom call button generation web pages of web server 128. In one embodiment, client computer 102 is presented with web pages including user-specific data such as user account information, billing information, and personal address book information, for example.

Each electronic token may contain various amounts of contact information. In one embodiment, the electronic token is self-describing in that it has encoded within it, all contact information necessary to facilitate a call between two parties, such as a caller (i.e. offeree) and a callee (i.e. destination party). Such contact information may include PSTN identifiers and/or IP addresses of the caller, the callee, and the bridgeport used to bridge the two calls. In the case of a self-describing electronic token, the bridgeport need not be notified of the electronic token's existence except upon the electronic token becoming activated. In an alternative embodiment, the electronic token has encoded within itself less than all necessary contact information. For example, in a basic implementation, the electronic token may only include a bridgeport address and a call identifier identifying the call to be established. The bridgeport, whose address is encoded within the electronic token, stores the remaining contact information in association with the call identifier. When the electronic token is activated, the identified bridgeport is contacted and the bridgeport performs a lookup to correlate the stored contact information with the call identifier. By not including all contact information within the electronic token, the token may be used for anonymous communication. In one embodiment of the invention, the electronic token is implemented as an extended markup language (XML) data structure, however the electronic token may also be implemented as a standard generalized markup language (SGML) data structure, or in other embodiments, other programming languages may be used. FIG. 7 illustrates two examples of an XML data structure each representing an electronic token according to one embodiment of the present invention.

Figure 2:
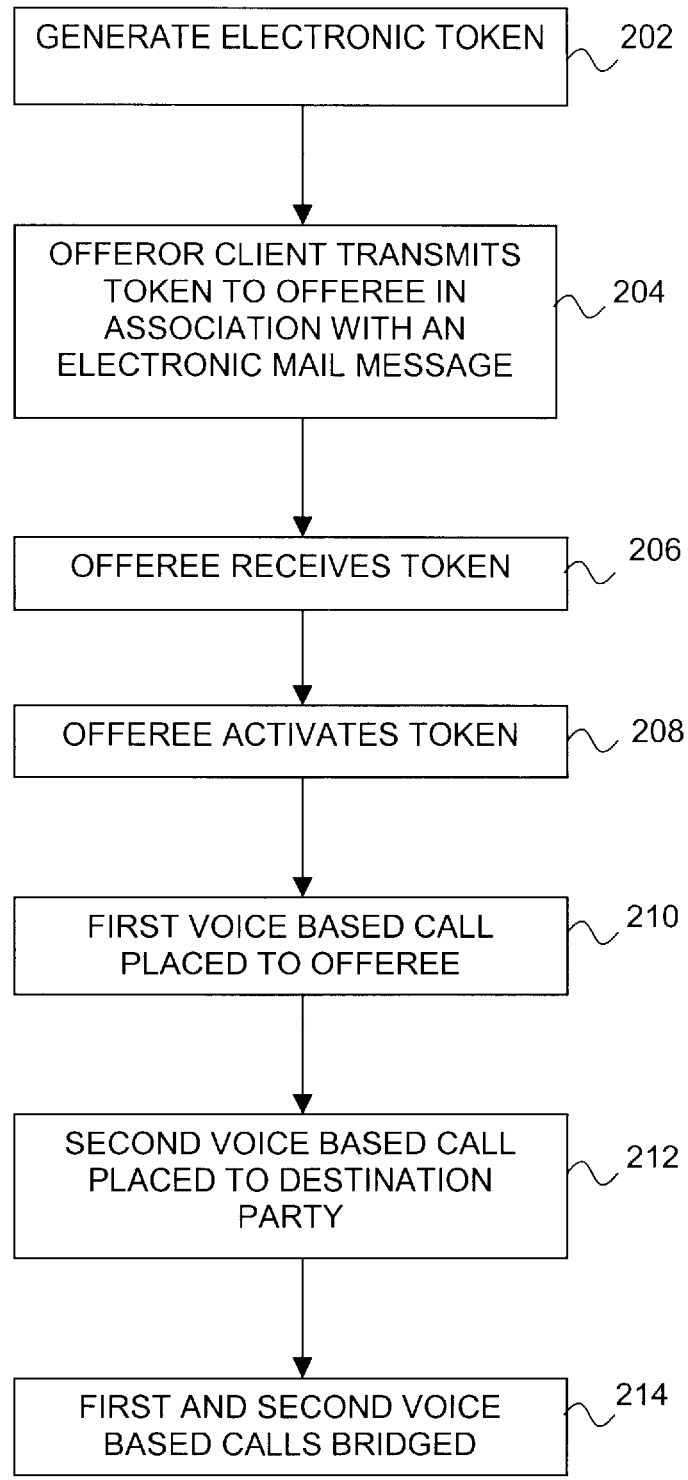
FIG. 2 is a flow diagram illustrating one embodiment of a method for establishing a voice communication session between two parties by way of an electronic mail message.

FIG. 2 is a flow diagram illustrating one embodiment of a method for establishing a voice communication session between two parties by way of an electronic token of the present invention. In accordance with the illustrated embodiment, an offeror (i.e., client computer 102) causes web server 128 to generate an electronic token representing an offer to participate in a voice call (block 202). In an alternative embodiment, client 102 includes programming instructions that when executed, cause client computer 102 to generate the electronic token. Once the token representing the offer to participate in a voice call has been generated, the offeror such as client computer 102 transmits the generated token to an offeree such as client computer 116, in association with an electronic mail message (block 204). Upon receiving the electronic token from the offeror (block 206), the offeree activates the token by, for example, selecting a graphical icon representing the token with a user input device such as a mouse (block 208). Upon activation of the electronic token, a bridgeport designated by the electronic token is contacted. In one embodiment, the contacted bridgeport places a first voice call to the designated offeree (block 210), and places a second voice call to the designated destination party (block 212). In an alternative embodiment, as described in U.S. Pat. No. 5,889,774 incorporated by reference above, the contacted bridgeport is one of a community of bridgeports (i.e. bridgeports 162 and 165) that determine among themselves how best to complete the first and second calls. Once the respective voice calls have been placed to the designated offeree and destination party, the calls are bridged by, for example at least one of bridgeports 162 and 165, so as to place the designated offeree and destination party in voice communication with each other (block 214). In one embodiment, the designated party is the offeror, however, the offeror need not necessarily be the destination party.

For example, a mother and father acting as offerors as well as the identified destination party, could generate or cause to have generated an electronic token that would be transmitted in association with an electronic mail message to their child who is away at college. Upon receiving the electronic token that has been either embedded within or attached to an email message from the parents, the child could activate the token by, for example, selecting a graphical representation of the token with a computer mouse. Upon activating the token, a first voice call would be placed from a bridgeport (e.g., bridgeport 162 and/or 165) to the child, and a second voice call would be placed from a bridgeport (e.g., bridgeport 162 and/or 165) to the parents. Thereafter, the two calls would be bridged to place the parents and the child in voice communication with one another.

Thus, in accordance with the teachings of the present invention, the token essentially functions as a preprogrammed virtual calling card that can be delivered from a first party to a second party for use by the second party in establishing a voice communication session with a designated destination party. Although the offeror and the destination party may be one of the same as in the parent/child example above, there are times when the destination party may not be the offeror, but rather a third party. For example, a mother and father may wish to deliver an electronic call token to their child, that when activated would place the child in voice communication with a grandparent, a family member, a friend, and so on. Similarly, the electronic calling token of the present invention could be used to place an offeree in voice communication with one or more designated business contacts, such as a family doctor, attorney, insurance agent, and so forth.

Although at times it may prove convenient for an offeror to designate the destination party that the offeree will be connected to upon activation of the token, it may also prove convenient for the offeror not to designate a destination party during token generation. In one embodiment of the invention, upon activation of the electronic call token, the offeree is given the option of providing an alphanumeric identifier of a destination party to be called. Because the offeror may not wish to grant the offeree full control over destination party designation, the offeror may choose to restrict who the offeree may select as a destination party, while still providing the offeree with some level of control. In one embodiment, the offeror may identify a group of one or more eligible parties that the offeree may designate as a destination party. For example, an offeror mother and father may provide to an offeree child, an electronic calling token that does not identify a specific destination party, but instead identifies a group of potential destination party candidates such as family members. When the child activates the token, the child is presented with a list of such destination party candidates from which the child may select the desired destination party. An offeror may identify a group of one or more eligible destination parties by name, however, an offeror may likewise identify a group of one or more eligible destination parties by one or more alphanumeric identifiers such as a PSTN extension.

In addition to an offeror being able to control (i.e. limit) the designation of a destination party, the offeror may likewise control or place conditions on other aspects of a voice communication session to be initiated via the electronic calling token of the present invention. For example, an offeror may stipulate (i.e. via the token) conditions that are required to be met before a communication session may be established between an offeree and a destination party. That is, the electronic call token functions as a conditional offer to participate in one or more voice calls with a designated destination party. For example, an offeror may stipulate the dates and times at which a communication session may be established between an offeree and a destination party, one or more geographic locations within which the destination party may be located, the maximum duration of a communication session to be established, and so forth. In one embodiment, such conditions are encoded within an XML data structure representing the electronic call token (see e.g. FIG. 7).

In one embodiment, services executing locally on an offeree client verify that the stipulated calling conditions specified by an offeror have been satisfied prior to initiating a PSTN based call to the designated destination party. In another embodiment, services executing on a web server verify that the calling conditions specified by an offeror have been satisfied prior to completing a PSTN based call to the designated destination party. For example, if an offeror has generated a conditional electronic call token placing limitations as to when the offeree may initiate a call, services executing on the offeree client may compare a local system time/date on the client with a time/date represented by the electronic call token. If the time/date represented by the electronic call token is found to be valid (i.e. is equivalent to a stipulated value or falls within a stipulated range of values represented by the token), the client contacts one of bridgeports 162 and 165 to initiate the call process as described above. If the time/date represented by the electronic call token is not found to be valid (i.e. is not equivalent to a stipulated value or does not fall within a stipulated range of values), the offeree is notified accordingly and the voice communication session between the offeree and the destination party does not progress any further.

Figure 8:
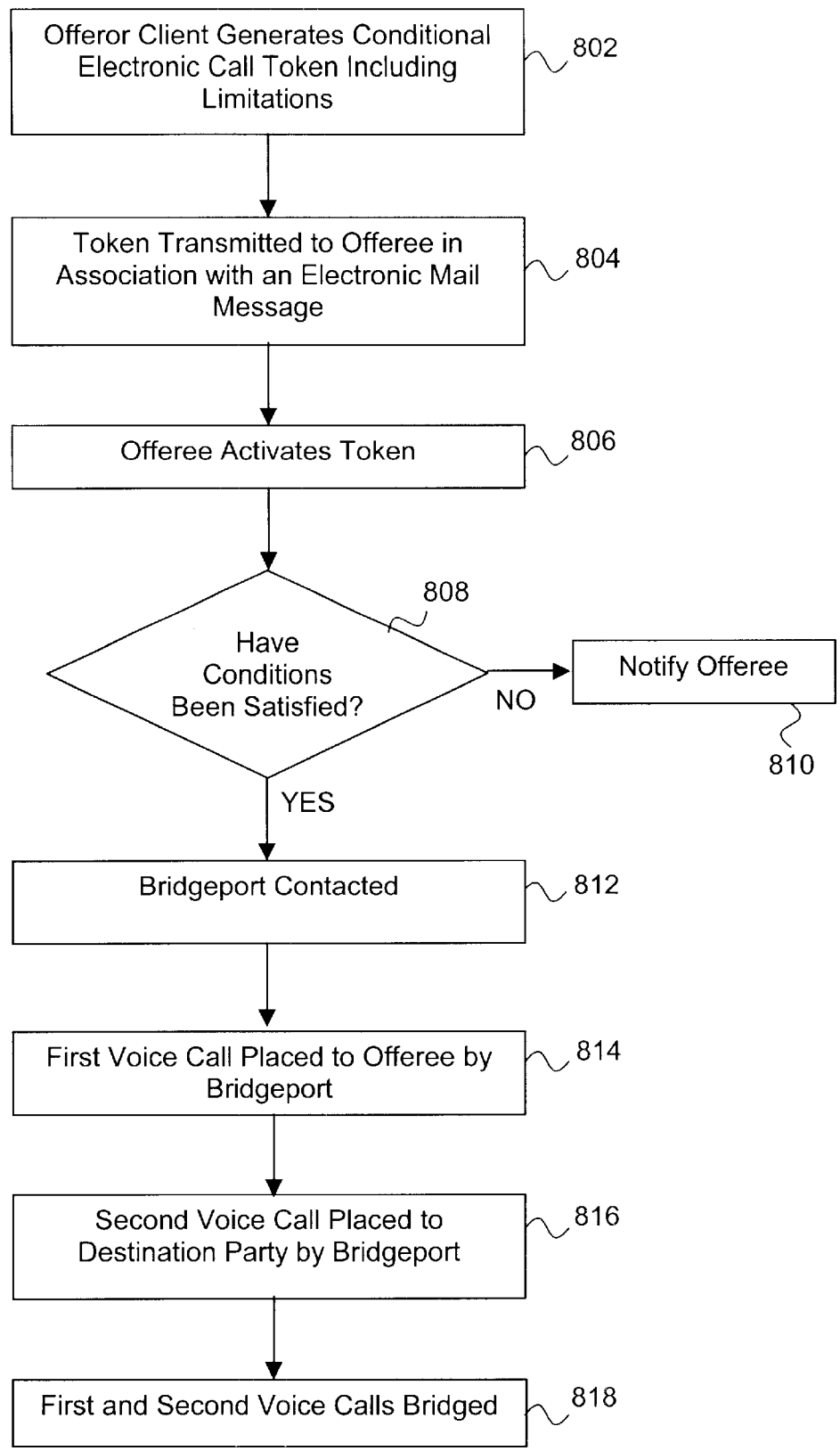
FIG. 8 is a flow diagram illustrating a method for establishing a voice communication session between an offeree and a destination party based upon a conditional offer in accordance with one embodiment of the present invention.

FIG. 8 is a flow diagram illustrating a method for establishing a voice communication session between an offeree and a destination party based upon a conditional offer in accordance with one embodiment of the present invention. First the offeror generates a conditional call token including various call limitations, (block 802). As described above, such limitations may include but are not limited to identification of a destination party, allowable geographic location (s) for the destination party, when (e.g. time and/or date) an offeree may initiate a voice communication session, and the duration of each voice communication session. Once the token is generated, whether by services executing on the client or on a server, the token is emailed (e.g. via SMTP) to the offeree, (block 804). Once the offeree activates the call token (block 806), a determination is made whether at least a subset of the conditions have been satisfied, (block 808). If the call token is generated by services executing on the client, the client may make such a determination. However, if the call token is generated by services executing on a remote device such as a web server or bridgeport, the respective server may make such a determination. If it is determined that the requisite conditions have not been met, the offeree is notified and the call process ends (block 810). However, if it is determined that the requisite conditions have been satisfied, an identified one of bridgeports 162 and 165 are then contacted (block 812). Thereafter, a first voice call is placed by the bridgeport to the offeree (block 814), a second voice call is placed by the bridgeport to the destination party (block 816), and the two voice calls are then bridged (block 818). Thus, the electronic call token of the present invention functions as a virtual calling card that can be personalized through the inclusion of offeree-specific call controls.

In accordance with one embodiment of the invention, the electronic token is generated based at least in part upon data supplied by the offeror. FIGS. 3(A–G) are graphical illustrations, each representing various data input dialogs presented to an offeror in association with generation of one or more the tokens according to one embodiment of the present invention. The dialogs may be generated by a web server, such as web server 128, or be generated by a local application executing on a client computer, such as client computer 102. If a web server generates the dialogs, the dialogs may be displayed as part of one or more web pages transmitted to the offeror via the hypertext transfer protocol (HTTP), for example. If the dialogs are generated by a locally executing application, however, the dialogs may appear as one or more windows upon the offeror's desktop and may be accessible to the offeror through one or more menu selections or buttons upon the offeror's desktop.

FIG. 3A represents one embodiment of a "call-type" data input dialog in which an offeror may select the type of voice call to be placed upon activation of the electronic token by an offeree. According to the illustrated embodiment, an offeror may choose to have the electronic token represent a VoIP-to-VoIP call, a VoIP-to-PSTN call, a PSTN-to-VoIP call, or a PSTN-to-PSTN call. By selecting the VoIP-to-VoIP call option, for example, the offeror indicates that VoIP based calls should be placed to both the offeree and the destination party, whereas by selecting the VoIP-to-PSTN call option, the offeror indicates that a VoIP based call should be placed to the offeree and a PSTN based call should be placed to the destination party. Similarly, the PSTN-to-VoIP call option places a first PSTN based call to the offeree and a second VoIP based call to the destination party, whereas the PSTN-to-PSTN call option places first and second PSTN based calls to both the offeree and the destination party. In the illustrated embodiment, each of the call selections correspond to a check box, however, radio buttons, image maps and other graphical and text based selection methods known in the art may likewise be used.

FIGS. 3(B–E) each represent an embodiment of a data input dialog for an offeror to designate an offeree and a destination party to be placed in voice communication with each other. In each of FIGS. 3(B–E) the offeror is presented with a first drop-down selection list for designating an offeree and a second drop-down selection list for designating a destination party. Although drop-down lists are shown, other data entry techniques known in the art may be utilized. Depending upon the type of call selected (e.g. through the dialog of FIG. 3A), the offeror may designate an offeree and a destination party by name, IP address, and/or PSTN extension. For example, in FIG. 3B, the offeree is designated by IP address, whereas in FIG. 3E, the offeree is designated by a PSTN identifier (i.e. telephone number). Some or all of the designation information, such as destination party name, IP address, and phone number may be retained in and accessed from a private/public address book of the offeror client.

FIG. 3F represents one embodiment of a "billing" data input dialog by which an offeror may enter billing-specific data to facilitate payment of a fee to a third party. The offeror may, for example, select to pay for the services provided by the third party by way a credit card, or the offeror may choose to have the fee billed to the offeror's pre-existing account. If the offeror selects to pay using a credit card, the offeror's ability to pay for such services is verified by an independent credit agency prior to generation of the token or call placement. In one embodiment, the offeror may choose to have the cost of the electronic token generation and/or call placement services billed to the offeree. Conceptually, this may function much like a "1–900" number, wherein a caller pays a fee to a service provider in order to receive some phone-based service. In this example, the offeror would function as both the service provider and the destination party. In one embodiment, the token is distributed to the offeree by way of solicited or unsolicited email from an advertising or telemarketing offeror. Upon activating the electronic token, the offeree may be presented with various billing options, such as those illustrated in FIG. 3F.

FIG. 3G represents one embodiment of a data input dialog by which an offeror may specify call controls to conditionally limit an offer to participate in a voice communication session. As described above with respect to FIG. 8, the call token may be generated so as to include numerous conditional statements limiting the performance of the communication session. For example, as illustrated in FIG. 3G, an offeror may specify the valid period of time within which a voice communication session may be established with a destination party. Similarly, the offeror may limit the date(s) according to which the voice communication session may be established, and the areas that the offeree may attempt to call. In one embodiment, the call area limitation is only presented to an offeror when a destination party is not designated through e.g. an input dialog such as that illustrated in FIGS. 3(B–E).

As alluded to previously, the electronic token generation and call placement services of the present invention may also be used to provide anonymous voice communication between an offeree and a destination party, wherein neither of the parties to the call have knowledge of the other's identity. For example, an Internet dating service could provide the electronic token generation service of the present invention. A user of the dating service would log into a web server, such as web server 128, and browse through one or more web pages linked to a database to provide the user with various levels of information related to individuals the user may wish to date. Once the user selects one of the potential candidates from the database, web server 128 would generate the electronic token using obfuscated or encrypted code in place of each user's personal contact information, such as PSTN extension or IP number for example. The dating service would then email the generated electronic token to the selected offeree.

Once the offeree receives the electronic token representing an offer to participate in a voice call with the offeror, the offeree may activate the token to be placed in voice communication with the offeror (i.e. as the destination party). In one embodiment, activating the electronic token causes an HTTP post to be transmitted to a remote server, such as web server 128 or bridgeport 162 or 167, which recognizes this as a token activation by the offeree. The remote server then performs a lookup in a database to correlate the contact information with the appropriate PSTN and/or IP connection information. In one embodiment, the remote server (e.g., web server 128) uses this connection information to place the offeree and destination party in voice communication with one another, whereas in another embodiment, remote server forwards this connection information to another server (e.g., bridgeports 162 and 165) to place the offeree and destination party in voice communication with one another. Nevertheless, the identity of the offeree and the offeror/destination party are not revealed to either party.

Figure 4:
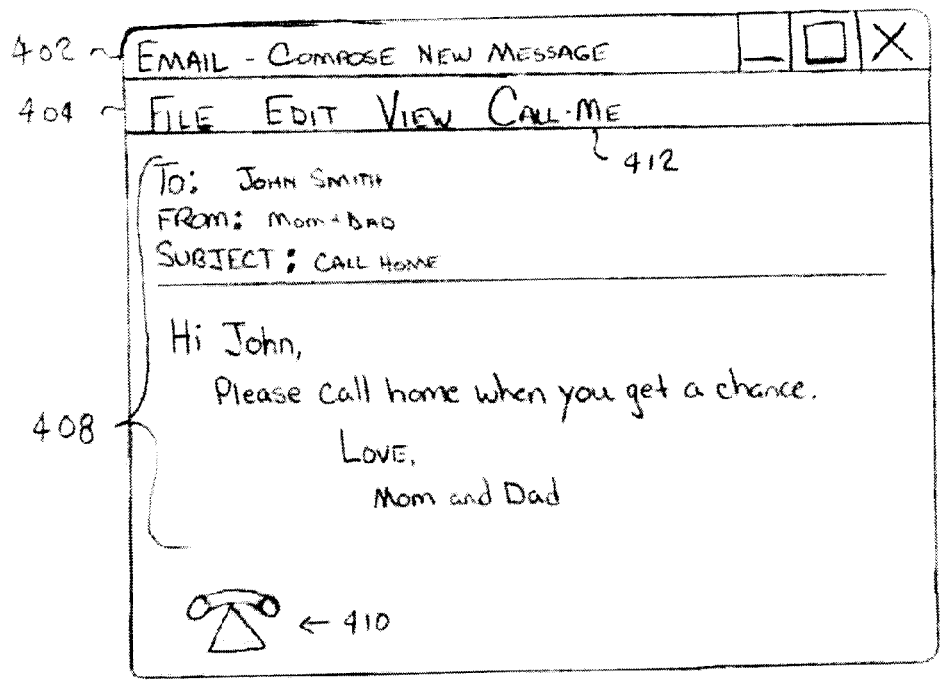
FIG. 4 is a graphical representation illustrating one embodiment of how an electronic token generated in accordance with the teachings of the present invention, may be displayed in association with an electronic mail message.

FIG. 4 is a graphical representation illustrating one embodiment of an email application in accordance with the teachings of the present invention. Email application 400 is shown including window title bar 402, window menu bar 404, action buttons 406, email message 408, and offer icon 410. Email application 400 represents any of the various electronic mail applications known in the art including, but not limited to Outlook, available from Microsoft Corp., and Notes, available from IBM Corp., of Armonk, N.Y., whereas email message 408 represents a text-based message generated by email application 400. Alternatively, email message 408 may be generated by a web-based email account accessed through a generic web-browser.

Except for the teachings of the present invention, window title bar 402, window menu bar 404, and action buttons 406 are WINDOWS™ operating system features known in the art. In one embodiment of the invention, email application 400 includes one or more application specific menu bar entries, and/or one or more application specific action buttons, to facilitate generation of the electronic token. For example, selecting "call-me" menu entry 412, or activating "call-me" button 413 may cause one or more data input dialogs, such as those described above with respect to FIGS. 3(A–F), to be displayed. Additional ones of action buttons 406 may provide further functionality with respect to the electronic token generation and call placement services of the present invention. For example, when activated, address button 414 causes an address book to be displayed on the desktop. In one embodiment, the address book is stored locally on the client computer, whereas in an alternative embodiment, the address book is stored on a remote server, such as web server 128. In one embodiment, address data and contact information displayed in association with action buttons 406 and/or menu bar 404 is used in the generation of the electronic token of the present invention.

Email application 400 also includes email message 408 and offer icon 410. Email message 408 represents an electronic mail message including address information to route email message 408 to its designated destination as well as message text. Offer icon 410 is a graphical representation of an offer to participate in a voice call that has been attached to email message 408 by, for example, an offeror, such as the mother and father of the previous example. In an alternative embodiment, offer icon 410 is a text-based representation, such as a uniform resource locater (URL), rather than a graphical representation.

Figure 5:
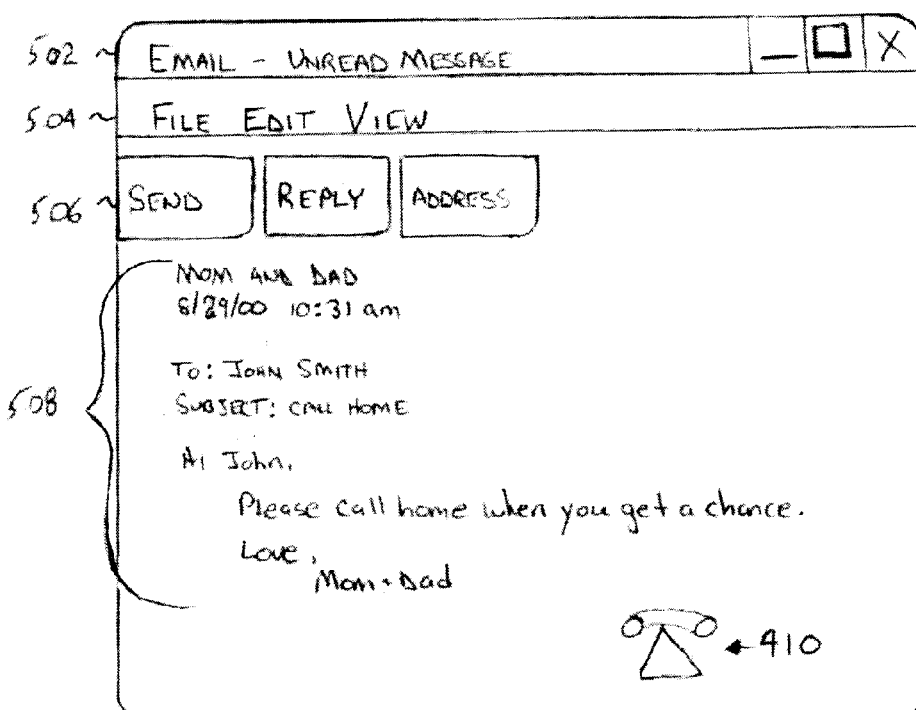
FIG. 5 is a graphical representation illustrating one embodiment of how a received electronic mail message may be displayed in accordance with the teachings of the present invention.

FIG. 5 is a graphical representation illustrating one embodiment of how a received electronic mail message may be displayed in accordance with the teachings of the present invention. Email message 500 is shown including window title bar 502, window menu bar 504, action buttons 506, message body 508, and offer icon 510. Except for the teachings of the present invention, window title bar 302, and window menu bar 304 are features of the WINDOWS™ operating system. Action buttons 506 represent graphical images that are each linked to a generic email feature or function depending upon the specific email application utilized. In one embodiment, action buttons 506 include a button that when selected by a user, cause one or more data input dialogs to be presented, such as those described above with respect to FIGS. 3(A–F).

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising
generating an electronic offer to participate in at least one voice communication session with a destination party, said offer being contingent upon the satisfaction of a set of one or more offeror-stipulated conditions governing establishment of the voice communication session;
receiving, at a bridgeport, an indication from an offeree via a data network indicating acceptance of said offer;
determining, by the bridgeport, an appropriate one of plurality of changeover servers capable of facilitating a voice call between a packet data network endpoint and a PSTN endpoint; and
initiating by the determined changeover server, immediately in response to the offeree's acceptance of said offer in addition to the satisfaction of at least a subset of the one or more offeror-stipulated conditions, the at least one voice communication session between the offeree and the destination party partly over the packet data network and partly over the PSTN without going through the bridgeport.

2. The method of claim 1, wherein said generating is performed by a web server.

3. The method of claim 2, further comprising said web server transmitting said offer to said offeree on behalf of said offeror.

4. The method of claim 2, further comprising said web server transmitting said offer to said offeror to be forwarded to said offeree.

5. The method of claim 1, wherein said offer is associated with a graphical icon.

6. The method of claim 5 wherein said offeree manifests said indication by activating said graphical icon.

7. The method of claim of 1, further comprising determining if said subset of the one or more offeror-stipulated conditions have been satisfied.

8. The method of claim 7, wherein said offeree determines if said subset of the one or more offeror-stipulated conditions have been satisfied.

9. The method of claim 1, wherein the step of initiating of the at least one voice communication session comprises initiating a first voice call between the determined changeover server and the offeree and initiating a second voice call between the determined changeover and the destination party.

10. The method of claim 9, wherein both the first and second voice calls are initiated by the determined changeover server.

11. The method according to claim 1 wherein said destination party is not designated by said offeror.

12. The method according to claim 11 further comprising the step of, upon acceptance of said offer, requesting from said offeree an alphanumeric identifier of a destination to be called.

13. The method according to claim 1 wherein an eligible group of destination parties is designated by said offeror.

14. The method according to claim 1 wherein said acceptance of said offer by said offeree is performed by activating an electronic token associated with said electronic offer.

15. A computer system comprising:
a storage medium having stored therein a plurality of programming instructions to implement a set of communication services on the computer system, said services including:
services for generating on behalf of an offeror client, a conditional electronic offer to participate in at least one voice call with a destination party, said conditional offer being contingent upon the satisfaction of a set of one or more offeror-stipulated conditions governing establishment of the voice call;
services for receiving on behalf of the offeror client, through a data network link, a notification from the offeree indicating the offeree's acceptance of the conditional offer;
service for causing a bridgeport to determine an appropriate one of plurality of changeover servers capable of facilitating a voice call between a packet data network endpoint and a PSTN endpoint;
services for causing the determined changeover server to initiate a voice communication session between the offeree and the destination party partly over the packet data network and partly over the PSTN without going through the bridgeport, in immediate response to the offeree's acceptance of the offer in addition to the satisfaction of at least a subset of the set of one or more offeror-stipulated conditions; and an execution unit coupled to the storage medium for executing the plurality of programming instructions.

16. The system of claim 15, further comprising services to transmit said electronic offer to said offeree.

17. The system of claim 15, further comprising services to transmit said electronic offer to said offeror to be forwarded to said offeree.

18. The system of claim 15, further comprising services to determine if the set of one or more offeror-stipulated conditions governing establishment of the voice call have been satisfied.

19. The system of claim 15, wherein services for causing a voice communication session to be established between the offeree and the destination party further comprise:

initiating a first call to the offeree over the packet data network;

initiating a second call to the destination party over the PSTN; and bridging the first and second calls.

20. The system of claim 19, wherein the destination party is the offeror.

21. The system of claim 15, wherein said conditions comprise a valid time range according to which said voice communication session may be established.

22. The system of claim 15, wherein said conditions comprise a valid date range according to which said voice communication session may be established.

23. The system according to claim 15 wherein said destination party is not identified.

24. The system according to claim 15 wherein an eligible group of destination parties is identified.

25. The system according to claim 15 wherein said electronic offer comprises at least one electronic token.

26. The system according to claim 25 wherein activation of said at least one electronic token effects acceptance of said offer.

27. The system according to claim 15 wherein said electronic offer comprises a plurality of electronic tokens.

28. The system according to claim 27 wherein at least one of said tokens comprises at least one condition that is different than at least one condition contained in another of said tokens.

29. A computer system comprising:

a storage medium having stored therein a plurality of programming instructions to implement a set of communication services on the computer system, said services including:

services for generating on behalf of an offeror client, a conditional electronic offer comprising at least one electronic token to facilitate establishment of a voice communication session between an offeree and a destination party, said conditional offer being contingent upon the satisfaction of a set of one or more offeror-stipulated conditions governing the establishment of the voice call;

services for transmitting said conditional offer to at least one of said offeror and said offeree;

services for receiving on behalf of the offeror client, through a data network link, a notification from the offeree indicating the offeree's acceptance of the conditional offer by activating said electronic token;

service for causing a bridgeport to determine an appropriate one of plurality of changeover servers capable of facilitating a voice call between a packet data network endpoint and a PSTN endpoint;

services for causing the determined changeover server to initiate said voice communication session partly over the packet data network and partly over the PSTN without going through the bridgeport immediately upon activation of said at least one electronic token in addition to the satisfaction of at least a subset of the one or more offeror-stipulated conditions; and an execution unit coupled to the storage medium for executing the plurality of programming instructions.

30. The system of claim 29, wherein said services for transmitting said conditional offer to at least one of said offeror and said offeree comprises services for transmitting said conditional offer to said offeror for subsequent forwarding by said offeror to said offeree.

31. The system of claim 29, wherein said conditional offer is transmitted to at least one of said offeror and said offeree via SMTP.

32. The system of claim 29, wherein said conditional offer is transmitted to at least one of said offeror and said offeree via HTTP.

33. A computer system comprising:

a storage medium having stored therein a plurality of programming instructions to implement a set of communication services on the computer system, said services including:

services for receiving, a conditional electronic offer to participate in at least one voice call with a destination party, said conditional offer being contingent upon the satisfaction of a set of one or more offeror-stipulated conditions governing establishment of the voice call, services for determining whether at least a subset of the set of one or more offeror-stipulated conditions have been satisfied, services for receiving an indication from an offeree signifying the offeree's acceptance of the offer, service for causing a bridgeport to determine an appropriate one of plurality of changeover servers capable of facilitating a voice call between a packet data network endpoint and a PSTN endpoint, services for transmitting upon receipt of said indication a notification to the determined changeover server to cause the determined changeover server to immediately initiate a voice communication session between the offeree and the destination party partly over the packet data network and partly over the PSTN without going through the bridgeport, said notification indicating the offeree's acceptance of the offer in addition to the satisfaction of at least the subset of one or more offeror-stipulated conditions, and an execution unit coupled to the storage medium for executing the plurality of programming instructions.

34. The system of claim 33, wherein said conditions comprise a valid time range according to which said voice communication session may be established.

35. The system of claim 33, wherein said conditions comprise a valid date range according to which said voice communication session may be established.

36. The system of claim 33, wherein costs associated with the voice communication session are charged to the offeror.

37. A computer system comprising:

a storage medium having stored therein a plurality of programming instructions to implement a set of communication services on the computer system, said services including:

services for generating on behalf of an offeror client, a conditional electronic offer comprising at least one electronic token to participate in at least one voice call with a destination party, said conditional offer being contingent upon the satisfaction of a set of one or more offeror-stipulated conditions governing establishment of the voice call, the electronic token to be transmitted by the offeror client to an offeree;

services for receiving on behalf of the offeror client, through a data network link, a notification from the offeree indicating the offeree's acceptance of the conditional offer;

services for determining whether at least a subset of said conditions has been satisfied;

service for causing a bridgeport to determine an appropriate one of plurality of changeover servers capable of facilitating a voice call between a packet data network endpoint and a PSTN endpoint;

services for causing the determined changeover server to initiate a voice communication session between said destination party and said offeree partly over the packet data network and partly over the PSTN without going through the bridgeport immediately in response to the offeree's activation of at least one of said tokens in addition to the satisfaction at least a subset of the set of one or more offeror-stipulated conditions; and an execution unit coupled to the storage medium for executing the plurality of programming instructions.

38. A virtual calling card comprising:

at least one electronic token, each token representing an offer to participate in at least one voice call with a destination party, said offer being contingent upon the satisfaction of a set of one or more offeror-stipulated conditions governing establishment of the voice communication session, said card operable in a computer system comprising a storage medium having stored therein a plurality of programming instructions to implement a set of communication services on a computer system for generating on behalf of an offeror client said electronic token, wherein said electronic token is to be transmitted by the offeror client to an offeree;

services for receiving on behalf of the offeror client, through a data network link, a notification from the offeree denoting the offeree's acceptance of the offeror client's offer;

service for causing a bridgeport to determine an appropriate one of plurality of changeover servers capable of facilitating a voice call between a packet data network endpoint and a PSTN endpoint; and services for causing the determined changeover server to initiate the voice communication session between the destination party and the offeree partly over the packet data network and partly over the PSTN without going through the bridgeport immediately in response to the offeree's acceptance , by activation of said token, of the offeror client's offer in addition to the satisfaction of at least a subset of the one or more offeror-stipulated conditions the at least one voice communication session between the offeree and the destination party; and an execution unit coupled to the storage medium for executing the plurality of programming instructions.

39. The invention according to claim 38 wherein at least one of said electronic tokens comprises a conditional offer contingent upon the satisfaction of a set of one or more offeror-stipulated conditions governing establishment of the voice call.

40. The invention according to claim 39 further comprising services for determining whether at least a subset of said conditions has been satisfied.

* * * * *